(12) United States Patent
Delisle (10) Patent No.: US 9,457,851 B2
(45) Date of Patent: Oct. 4, 2016

(54) CRAWLER TRACK AND CRAWLER TRACK SEGMENT

(71) Applicant: DST DEFENCE SERVICE TRACKS GMBH, Freisen (DE)

(72) Inventor: Marc Delisle, Quebec (CA)

(73) Assignee: DST Defence Service Tracks GmbH, Freisen (DE)

( * ) Notice: Subject to any disclaimer, the term of this patent is extended or adjusted under 35 U.S.C. 154(b) by 219 days.

(21) Appl. No.: 14/273,021

(22) Filed: May 8, 2014

(65) Prior Publication Data

US 2014/0239709 A1    Aug. 28, 2014

Related U.S. Application Data

(63) Continuation of application No. PCT/EP2012/004619, filed on Nov. 6, 2012.

(30) Foreign Application Priority Data

Nov. 12, 2011   (DE) .................. 10 2011 118 421

(51) Int. Cl.
  *B62D 55/20*   (2006.01)
  *B62D 55/24*   (2006.01)

(52) U.S. Cl.
  CPC ............. *B62D 55/202* (2013.01); *B62D 55/20* (2013.01); *B62D 55/24* (2013.01); *B62D 55/244* (2013.01)

(58) Field of Classification Search
  CPC .... B62D 55/202; B62D 55/20; B62D 55/24; B62D 55/244
  USPC ....... 305/165, 178, 160, 169, 180, 173, 174, 305/195, 199, 115, 159
  See application file for complete search history.

(56) References Cited

U.S. PATENT DOCUMENTS

| | | | |
|---|---|---|---|
| 3,118,709 A | 1/1964 | Case | |
| 3,515,443 A | 6/1970 | Hallaman | |
| 5,814,167 A | 9/1998 | Beaudoin | |
| 6,196,646 B1 | 3/2001 | Edwards | |
| 7,090,312 B2 * | 8/2006 | Soucy ................. | B62D 55/125 305/160 |

(Continued)

FOREIGN PATENT DOCUMENTS

| | | |
|---|---|---|
| CA | 1141803 A | 2/1983 |
| DE | 60219697 T2 | 12/2007 |
| DE | 202011005394 U1 | 10/2011 |
| GB | 2229410 A | 9/1990 |

(Continued)

*Primary Examiner* — S. Joseph Morano
*Assistant Examiner* — Jean Charleston
(74) *Attorney, Agent, or Firm* — Laurence A. Greenberg; Werner H. Stemer; Ralph E. Locher (57) ABSTRACT

A crawler track for a crawler tracked vehicle is configured for running via a drive wheel and via bogie wheels. The crawler track has an outer ground contact side and an inner wheel contact side. The inner wheel contact side is formed with a flat surface from which a plurality of guide horns project to guide the crawler track during the movement of the crawler tracked vehicle. At least parts of the flat surface serve as the running surface for the bogie wheels. Cavities are formed in the flat surface for the engagement of drive pegs of the drive wheel.

15 Claims, 5 Drawing Sheets

(56) References Cited

U.S. PATENT DOCUMENTS

| | | |
|---|---|---|
| 7,300,119 B2 | 11/2007 | Ueno |
| 2002/0050741 A1* | 5/2002 | Gauthier ............... B29C 37/005 305/165 |
| 2005/0035655 A1* | 2/2005 | Beckstrom ........... B62D 55/112 305/173 |
| 2008/0100134 A1* | 5/2008 | Soucy ................. B62D 55/244 305/179 |
| 2011/0272077 A1* | 11/2011 | Subotsch ........... C08G 18/7621 156/71 |

FOREIGN PATENT DOCUMENTS

| | | |
|---|---|---|
| GB | 2410729 A | 8/2005 |
| JP | 2011084092 A | 4/2011 |
| WO | 2011045993 A1 | 4/2011 |
| WO | 2013068098 A1 | 5/2013 |

* cited by examiner

CRAWLER TRACK AND CRAWLER TRACK SEGMENT

CROSS-REFERENCE TO RELATED APPLICATION

This application is a continuation, under 35 U.S.C. §120, of copending international application No. PCT/EP2012/004619, filed Nov. 6, 2012, which designated the United States; this application also claims the priority, under 35 U.S.C. §119, of German patent application No. DE 10 2011 118 421.3, filed Nov. 12, 2011; the prior applications are herewith incorporated by reference in their entirety

BACKGROUND OF THE INVENTION

Field of the Invention

The invention relates to a crawler track segment or a crawler track for a crawler tracked vehicle which is suitable for running via a drive wheel and via bogie wheels. The crawler track or the crawler track segment has an outer ground contact side and an inner wheel contact side. The inner wheel contact side has a flat surface from which a plurality of guide horns project to guide the crawler track or the crawler track segment during the movement of the vehicle. At least parts of the flat surface serve as the running surface for the bogie wheels. A crawler track of this generic kind is described in U.S. Pat. No. 7,090,312 B2.

The crawler track in U.S. Pat. No. 7,090,312 B2 has a plurality of guide horns arranged behind one another on the central longitudinal axis of its inner wheel contact side. These guide horns form a virtually continuous wall which fits into the hollows formed in the drive wheel, the idler and the bogie wheels. The fit of the guide horns in the hollows enables the crawler track to be guided during movement of the crawler track vehicle. In addition, the crawler track in U.S. Pat. No. 7,090,312 B2 has a plurality of projections, which are referred to as traction pegs and are arranged along each side of the crawler track. These traction pegs are designed in such a manner that they engage in a fitting manner with corresponding hollows in the drive wheel. They thereby guarantee the transfer of power from the engine of the crawler tracked vehicle to the crawler track. Between the guide horns and the traction pegs is located a flat running surface on which the bogie wheels of the crawler tracked vehicle run and support the weight of the crawler tracked vehicle.

Even if this crawler track works well, it nevertheless has the disadvantage that it is relatively heavy and reduces the agility of the crawler tracked vehicle due to its high inertia.

SUMMARY OF THE INVENTION

It is accordingly an object of the invention to provide a crawler track which overcomes the disadvantages of the heretofore-known devices of this general type and which provides for a crawler track that avoids, or at least mitigates, a variety of the disadvantages associated with the prior art devices.

With the foregoing and other objects in view there is provided, in accordance with the invention, a crawler track assembly for a crawler tracked vehicle to be driven via a drive wheel formed with drive pegs and via bogie wheels, the crawler track assembly comprising:

an outer ground contact side and an inner wheel contact side;

the inner wheel contact side having a flat surface and a plurality of guide horns projecting from the flat surface for guiding the crawler track during a movement of the crawler tracked vehicle;

at least a portion of the flat surface serving as a running surface for the bogie wheels, and the flat surface having cavities formed therein for engagement of drive pegs of the drive wheel.

In other words, the objects of the invention are achieved by the novel crawler track and also by the novel crawler track segment. This means that all the features and properties described below can be applied both to a continuous, self-contained crawler track, and also to a crawler track segment of a segmentable crawler track. For easier reading, the comments below will relate only to the embodiment in the case of a crawler track, although this does not mean that these embodiments cannot also be applied in the case of a crawler track segment.

According to the invention, cavities are provided in the flat surface on the inner wheel contact side of the crawler track or the crawler track segment for the engagement of drive pegs of the drive wheel. In this way, the traction pegs customary hitherto in the state of the art can be dispensed with. This leads to a weight saving compared with the state of the art and therefore to a lighter, more agile track, which can therefore be accelerated more easily. This represents a great advantage compared with a conventional crawler track with traction pegs, particularly when starting and breaking the crawler tracked vehicle.

According to a preferred embodiment of the present invention, the crawler track exhibits cavities in the form of holes. This means that the cavities penetrate the crawler track from the wheel contact side to the ground contact side. The configuration of the cavities in the form of holes has the advantage that drive pegs of the drive wheel which are relatively large or tall in design can engage particularly deeply with the flat surface on the inner wheel contact side of the crawler track. This is advantageous, particularly during the starting and sharp acceleration of the crawler tracked vehicle, as a deep engagement of this kind means that a high torque can be transferred from the drive wheel to the crawler track.

However, it may also be advantageous if the crawler track only exhibits cavities that do not penetrate as far as the ground contact side from the wheel contact side. The advantage of this is high structural integrity of the crawler track. It is particularly advantageous, however, if the crawler track has both cavities in the form of holes and also cavities which do not penetrate as far as the ground contact side from the wheel contact side. This means that both a high torque transmission and also a high structural integrity of the crawler track are achieved. In addition, the non-penetrating cavities in conjunction with smaller or lower drive pegs of the drive wheel effectively support the propulsion of the crawler tracked vehicle, particularly when traveling faster (without greater acceleration).

The cavities not penetrating as far as the ground contact side preferably exhibit the shape of channels which have at least one directional component perpendicular to the longitudinal axis of the crawler track. The channels are therefore oriented obliquely to the longitudinal axis of the crawler track. It is particularly advantageous if the channels are oriented perpendicularly to the longitudinal axis of the crawler track, as in this case the power transmission to the crawler track is maximal.

The channels may run over a part or parts of the entire width of the crawler track. It is particularly advantageous, however, if the channels extend between the guide horns over the entire width of the crawler track. This means, on the one hand, that the driving force can be distributed onto the entire width of the crawler track via correspondingly wide drive pegs of the drive wheel, said drive pegs engaging with the channels, which helps prevent slippage, particularly during starting and acceleration. On the other hand, yet another positive synergy effect is also achieved however, as the crawler track becomes thinner in the region of the channels, which results in easier bend ability of the crawler track in the region of the channels. This means that the crawler track can run via the drive wheel and the idler more easily without any great resistance where the deflection angle of the crawler track is greatest.

According to a particularly preferred embodiment of the invention, one or a plurality of holes is/are connected at the level of the gap between two guide horns on the one side alongside the central longitudinal axis of the crawler track via one of the channels described above to one or a plurality of holes at the level of the gap between these two guide horns on the other side alongside the central longitudinal axis of the crawler track. Since the holes lie on a line with the channels, the bend ability of the track is increased still further in this region, so that in addition to the great agility of the crawler track due to the weight saving, optimum roll ability of the crawler track via the drive wheel and the idler also results.

The crawler track is produced substantially of polymer, preferably elastic materials such as rubber and/or other elastomers. For structural reinforcement of the crawler track or segments thereof, inserts made of metal and/or fabrics are preferably incorporated.

Metal strips are preferably incorporated between the holes parallel to the central longitudinal axis of the crawler track into the flat surface and into the perforated wall. This measure means that the service life of the crawler track according to the invention can be significantly increased, since the load of the surfaces in the engagement region of the longer drive pegs of the drive wheel engaging with the holes is particularly high, on account of the particularly great torque load.

Running cams or running ribs are preferably arranged on the outer ground contact side of the crawler track, which can be optimized depending on form for traction between the crawling track and the base and/or to protect the base surface (road).

According to a further preferred embodiment of the present invention, the lateral side of the guide horns pointing to the longitudinal axis of the vehicle is chamfered in the upper region at the front and/or back. In this way, the tendency of the crawler track to be thrown when transverse forces act on the running wheels (so particularly during quick cornering) can be reduced.

Other features which are considered as characteristic for the invention are set forth in the appended claims.

Although the invention is illustrated and described herein as embodied in a crawler track or crawler track segment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 8:
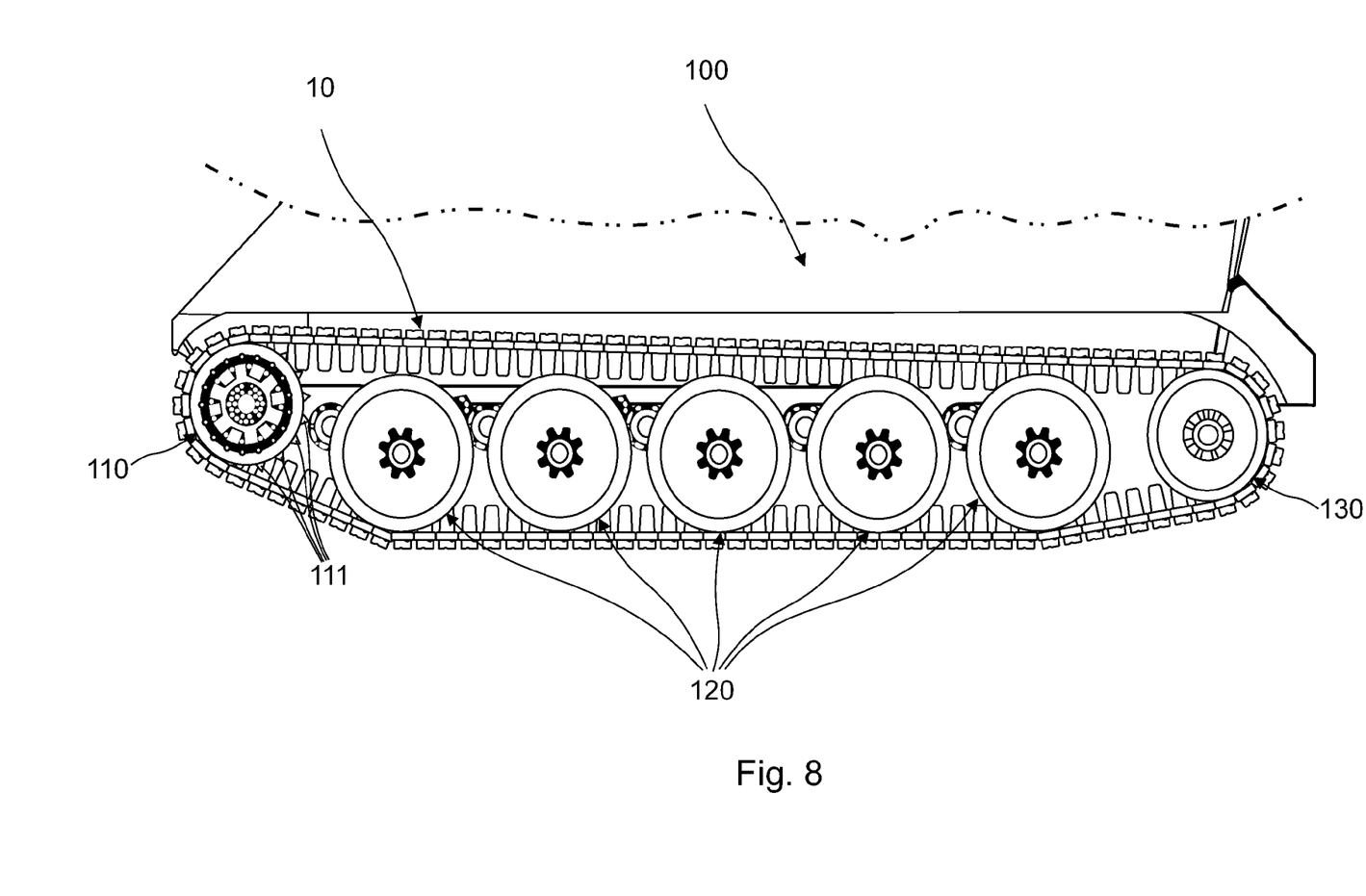
FIG. 8 shows a side view of the deployment of a crawler track according to the invention on a crawler tracked vehicle with a drive wheel, bogie wheels and idler.

Referring now to the figures of the drawing in detail, FIG. 8 shows a crawler track 10 according to the invention deployed on a crawler tracked vehicle 100. The crawler track 10 is set up to run via a drive wheel 110, via bogie wheels 120 and an idler 130.

Referring now more specifically to the different views and sectional views in FIGS. 1 to 7, a crawler track assembly is formed as a track segment 1 or as a complete endless crawler track 10. The crawler track assembly, illustrated in FIG. 1 as a crawler track segment 1, has an outer ground contact side 2 and an inner wheel contact side 3. The inner wheel contact side 3 includes a flat surface 4 from which a plurality of guide horns 5 project to guide the crawler track 10 or the crawler track segment 1 during the movement of the crawler tracked vehicle 100. At least parts of the flat surface 4 serve as the running surface for the bogie wheels 120. In the flat surface 4, cavities 6, 6*a*, 6*b* are provided for the engagement of drive pegs 111 of the drive wheel 110.

The guide horns 5 are arranged on the central longitudinal axis of the crawler track 10 or of the crawler track segment 1. The flat surface 4 extends over the entire width of the crawler track 10 or of the crawler track segment 1.

The crawler track segment 1 in FIGS. 1 to 7 is formed with cavities in the form of holes 6A which penetrate the crawler track segment 1 from the wheel contact side 3 as far as the ground contact side 2. The holes 6A have a substantially rectangular cross section in the plan view. The hole edges running perpendicular to the central longitudinal axis of the crawler track segment 1 are chamfered, so that the drive pegs 111 of the drive wheel 110 can engage with the holes 6A during the rolling process of the crawler track segment 1 on the drive wheel 110.

In addition, the crawler track segment 1 is formed with (blind) cavities 6B which do not penetrate as far as the ground contact side 2 from the wheel contact side 3. These blind cavities 6B are in the form of channels which are oriented perpendicular to the longitudinal axis of the crawler track segment 1. The channels 6B run between the guide horns 5 over the entire width of the crawler track segment 1. In this case, a hole 6A is connected in each case at the level of the gap between two guide horns 5 on the one side alongside the central longitudinal axis of the crawler track segment 1 via a channel 6B to a hole 6A in each case at the height of the gap between these two guide horns 5 on the other side alongside the central longitudinal axis of the crawler track segment 1. It is also possible, however, for two or more holes 6A to be arranged at the level of the gap between two guide horns 5 on one side alongside the central longitudinal axis of the crawler track segment 1 and these holes 6A are aligned with the channel 6B. In addition, it is also possible for the holes 6A not to be at the level of the gap between two guide horns 5, but between the channels 6B at the level of the guide horns 5. A combination of these two arrangement possibilities of the holes 6A is also possible, wherein it is advantageous when the holes 6A are arranged at the level of the gaps between two guide horns 5 and the holes 6A at the level of the guide horns 5 are arranged offset laterally to one another.

Running ribs 20 are arranged on the outer ground contact side 2, which are optimized for improved traction and/or to protect the base surface. The crawler track segment 1 is substantially made of polymer, preferably of elastic materials such as rubber and/or other elastomers. Inserts 9 made of metal and/or fabric are incorporated into the crawler track segment 1 for structural reinforcement. The inserts or reinforcing means 9 may be in the form of cables, fibers, metal sheets, and/or other formed components.

Figure 3:
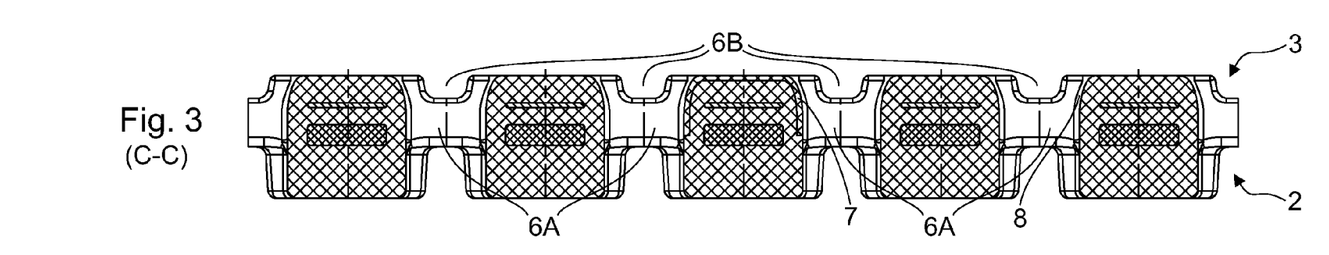
FIG. 3 shows a sectional view of the crawler track segment depicted in FIG. 1 along the sectional line C-C depicted in FIG. 1.
Figure 4:
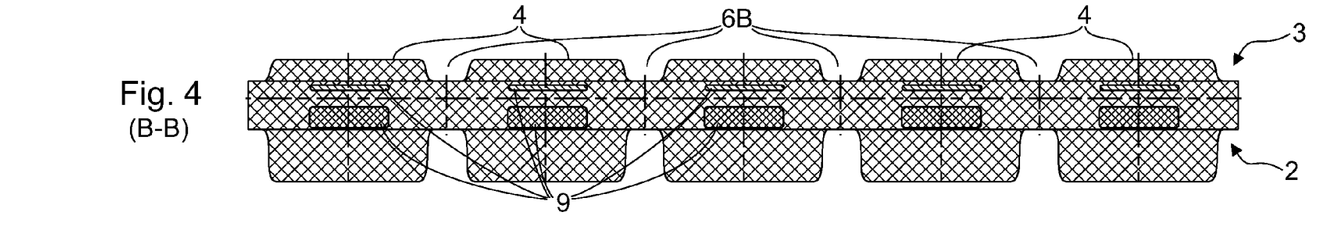
FIG. 4 shows a sectional view of the crawler track segment depicted in FIG. 1 along the sectional line B-B depicted in FIG. 1.

As shown in the middle in FIG. 3 by way of example, metal strips 7 can be incorporated into the flat surface 4 and the perforated wall 8 between the holes 6A parallel to the central longitudinal axis of the crawler track segment 1.

Figure 1:
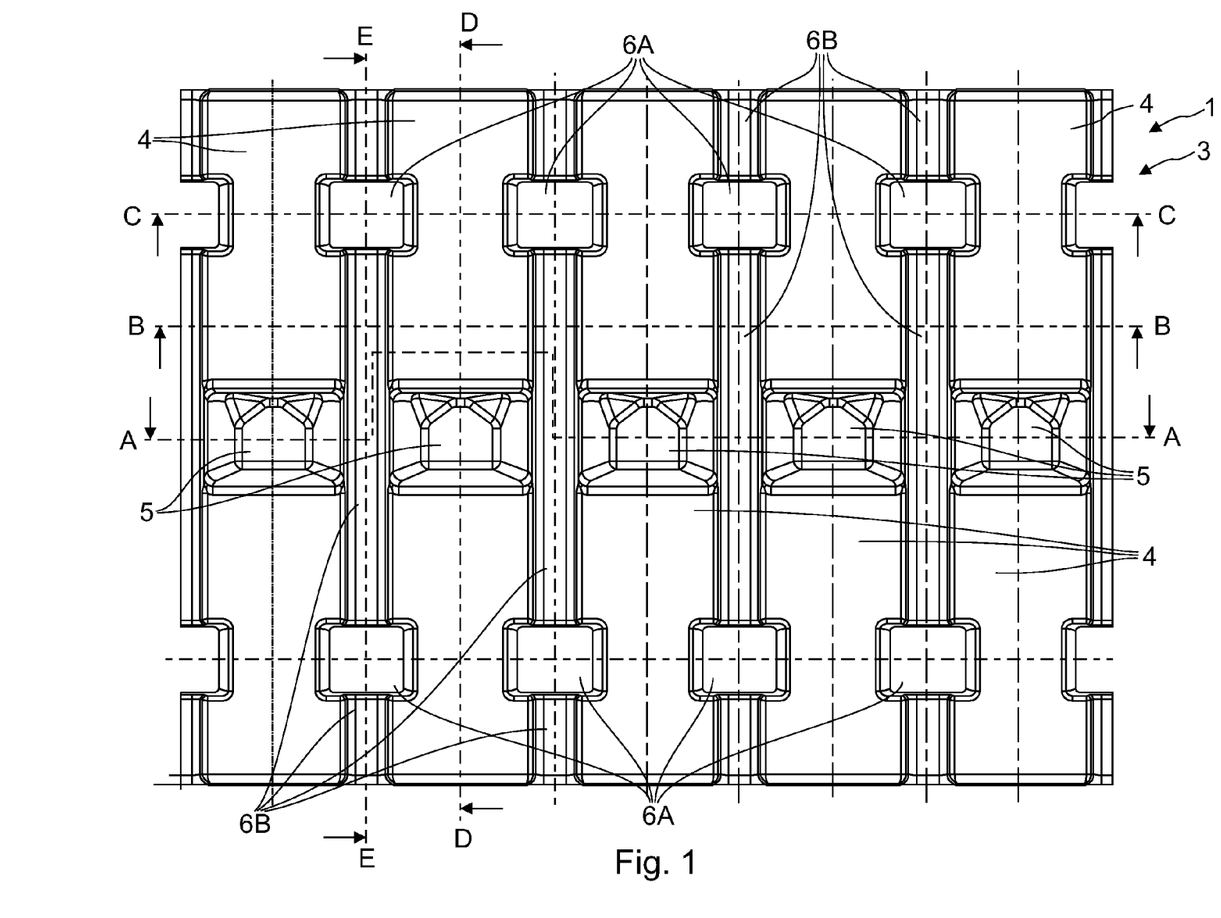
FIG. 1 shows a plan view of a preferred embodiment of a crawler track segment according to the invention.
Figure 2:
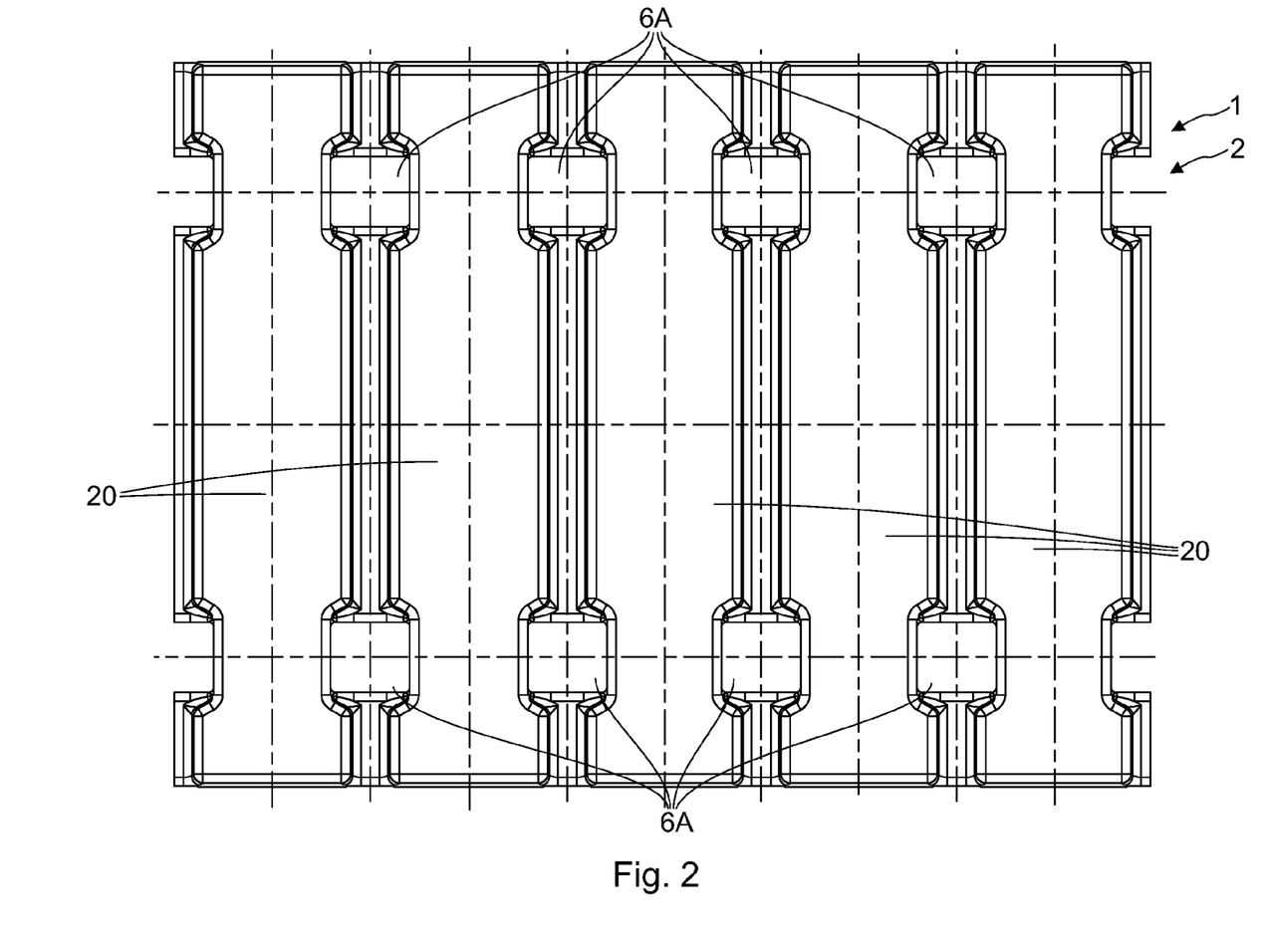
FIG. 2 shows a bottom view of the crawler track segment depicted in FIG. 1.
Figure 5:
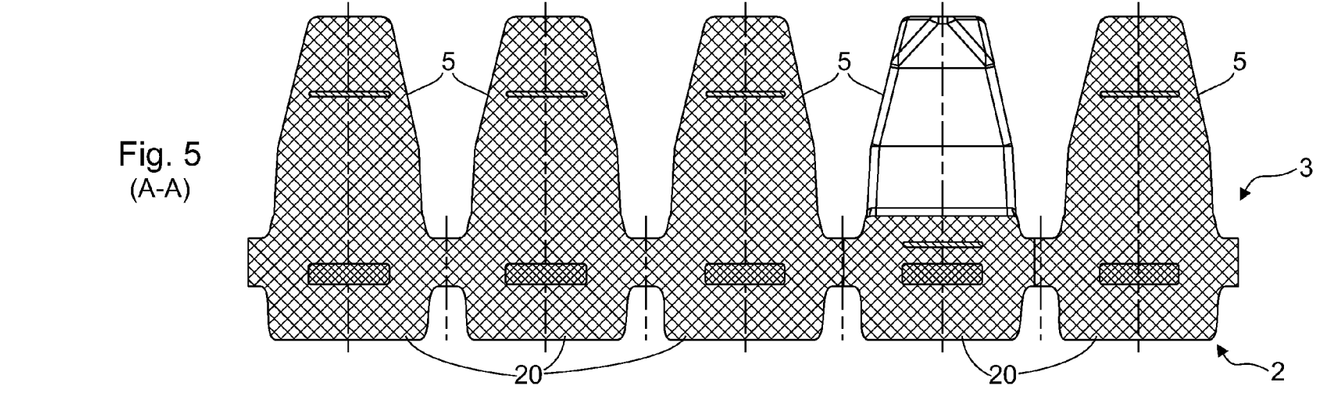
FIG. 5 shows a sectional view of the crawler track segment depicted in FIG. 1 along the sectional line or partial side view line A-A depicted in FIG. 1.
Figure 6:
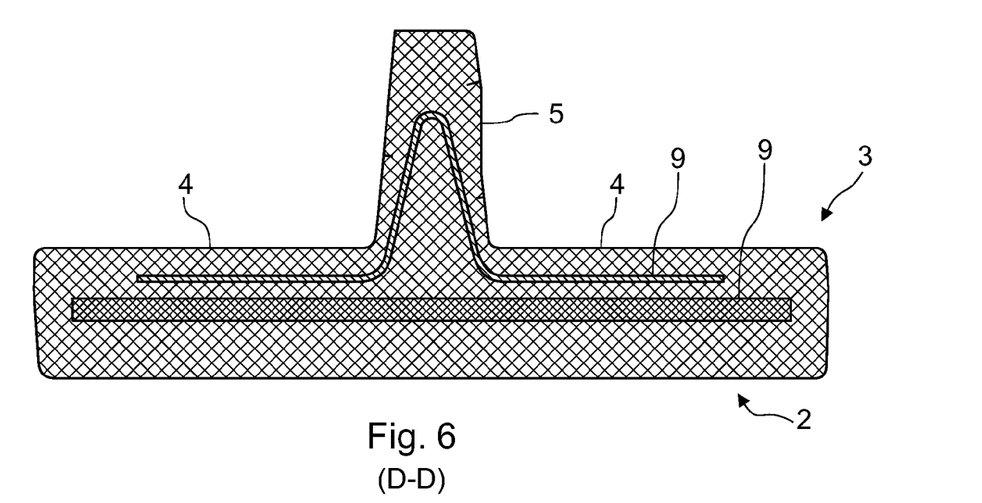
FIG. 6 shows a sectional view of the crawler track segment depicted in FIG. 1 along the sectional line D-D depicted in FIG. 1.
Figure 7:
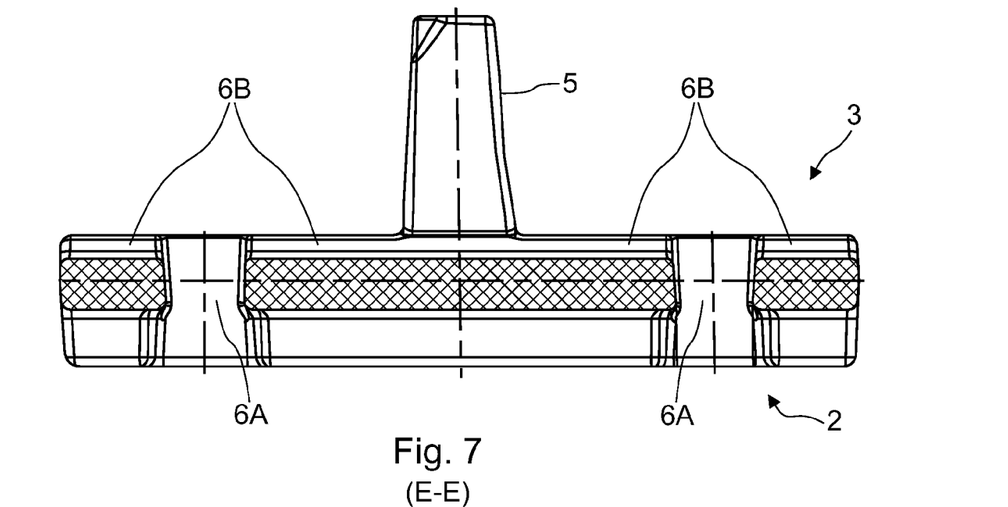
FIG. 7 shows a sectional view of the crawler track segment depicted in FIG. 1 along the sectional line E-E depicted in FIG. 1.

As can be seen from FIGS. 1 and 5, the lateral side of the guide horns 5 pointing towards the longitudinal axis of the vehicle may be chamfered in the upper region at the front and/or back.

The channels described above may, but need not, be completely used for the drive, both in terms of the number of channels and also the length thereof. In this way, individual channels can be left out of the drive design entirely; with other channels, in turn, only the inner part (between hole 6A and the guide horn 5), for example, or only the outer part (from the hole 6A to the outer edge of the crawler track segment 1) can be used for the drive.

Even if the present invention is not limited to completely dispensing with traction pegs on the inner wheel contact side 3 of the crawler track 10, it still remains to be established that the crawler track 10 according to the invention or else the crawler track segment 1 according to the invention still functions even without any traction pegs or other projections from the running surface.

The following is a summary list of reference numerals and the corresponding structure used in the above description of the invention:
1 Crawler track segment
2 Outer ground contact side (of 1)
3 Inner wheel contact side (of 1)
4 Flat surface (of 3)
5 Guide horn
6 Cavity (in 4)
6A Hole
6B Channel
7 Metal strip
8 Perforated wall (of 6A)
9 Insert
10 Crawler track
20 Running cam or running rib
100 Crawler track vehicle
110 Drive wheel
111 Drive peg (of 110)
120 Bogie wheel
130 Idler

The invention claimed is:

1. A crawler track assembly for a crawler tracked vehicle to be driven via a drive wheel formed with drive pegs and via bogie wheels, the crawler track assembly comprising:
an outer ground contact side and an inner wheel contact side;
said inner wheel contact side having a flat surface and a plurality of guide horns projecting from said flat surface for guiding the crawler track during a movement of the crawler tracked vehicle;
at least a portion of said flat surface serving as a running surface for the bogie wheels, and said flat surface having cavities formed therein for engagement of drive pegs of the drive wheel;
the crawler track assembly being configured as a crawler track or crawler track segment formed with blind cavities at said wheel contact side that do not penetrate as far as said ground contact side.

2. The crawler track assembly according to claim 1, configured to form a complete endless crawler track.

3. The crawler track assembly according to claim 1, configured as a crawler track segment of a complete crawler track.

4. The crawler track assembly according to claim 1, wherein said guide horns are arranged along a central longitudinal axis of a crawler track assembly.

5. The crawler track assembly according to claim 1, wherein said flat surface extends over an entire width of the crawler track assembly.

6. The crawler track assembly according to claim 1, configured as a crawler track or crawler track segment formed with cavities being throughholes penetrating through the crawler track assembly from said wheel contact side to said ground contact side.

7. The crawler track assembly according to claim 6, wherein one or a plurality of said throughholes are connected at a level of a gap formed between two said guide horns on a side alongside a central longitudinal axis of the crawler track or crawler track segment via a channels to one other or a plurality of other said throughholes at the level of the gap between the two guide horns on the other side alongside the central longitudinal axis of the crawler track or the crawler track segment.

8. The crawler track assembly according to claim 1, wherein said cavities are channels oriented perpendicularly to a longitudinal axis of the crawler track or crawler track segment.

9. The crawler track assembly according to claim 8, wherein said channels extend between said guide horns over an entire width of the crawler track or crawler track segment.

10. The crawler track assembly according to claim 9, wherein one or a plurality of said throughholes are connected at a level of a gap formed between two said guide horns on a side alongside a central longitudinal axis of the crawler track or crawler track segment via one or a plurality of said channels to one other or a plurality of other said throughholes at the level of the gap between the two guide horns on the other side alongside the central longitudinal axis of the crawler track or the crawler track segment.

11. The crawler track assembly according to claim 1, configured as a crawler track or crawler track segment produced substantially of polymer with inserts incorporated therein for structural reinforcement.

12. The crawler track assembly according to claim 11, wherein said polymer is an elastic material selected from the group consisting of rubber and elastomer, and said inserts are selected from the group consisting of metal inserts and fabric inserts.

13. The crawler track assembly according to claim 11, configured as a crawler track or crawler track segment formed with cavities being throughholes penetrating through the crawler track assembly from said wheel contact side to said ground contact side, and further comprising metal strips incorporated into said flat surface and into a perforated wall between said throughholes parallel to a central longitudinal axis of the crawler track or the crawler track segment.

14. The crawler track assembly according to claim 1, wherein said outer ground contact side is formed with running cams or running ribs.

15. The crawler track assembly according to claim 1, wherein a lateral side of said guide horns pointing to a longitudinal axis of the vehicle is chamfered in an upper region at a forward face and/or at a rearward face.

* * * * *